United States Patent
Miura et al.

(10) Patent No.: US 7,840,960 B2
(45) Date of Patent: Nov. 23, 2010

(54) CONTENT DISTRIBUTION METHOD AND CONTENT DISTRIBUTION PACKAGE

(75) Inventors: Akira Miura, Sagamihara (JP); Hiroshi Suu, Chigasaki (JP); Akihiro Kasahara, Sambu-Gun (JP); Kazunori Nakano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1551 days.

(21) Appl. No.: 11/138,456

(22) Filed: May 27, 2005

(65) Prior Publication Data

US 2005/0216905 A1 Sep. 29, 2005

Related U.S. Application Data

(63) Continuation of application No. PCT/JP03/15662, filed on Dec. 8, 2003.

(30) Foreign Application Priority Data

Dec. 17, 2002 (JP) .............................. 2002-365258

(51) Int. Cl.
*G06F 9/445* (2006.01)
*G06F 9/44* (2006.01)
*G06F 3/00* (2006.01)
*G06F 11/30* (2006.01)

(52) U.S. Cl. ............... 717/177; 717/172; 717/175; 713/191; 719/321

(58) Field of Classification Search .............. None
See application file for complete search history.

(56) References Cited

U.S. PATENT DOCUMENTS 5,862,347 A * 1/1999 Suzuki et al. ............... 709/247
7,284,243 B2 * 10/2007 Burgess ...................... 717/175
7,290,285 B2 * 10/2007 McCurdy et al. ............. 726/27
7,747,982 B1 * 6/2010 Sie et al. ..................... 717/118
2001/0029607 A1 * 10/2001 Veres et al. .................. 717/11
2002/0006204 A1 * 1/2002 England et al. .............. 380/269

(Continued)

FOREIGN PATENT DOCUMENTS

| CN | 1371057 A | 9/2002 |
|----|-----------|--------|
| EP | 1 170 924 A2 | 1/2002 |
| JP | 7-129407 | 5/1995 |
| JP | 2000-29804 | 1/2000 |
| JP | 2001-75800 | 3/2001 |

(Continued)

OTHER PUBLICATIONS

"Managing layout constraints in a platform for customized multimedia content packaging", Kroner et al., May 2002, pp. 89-93, <http://delivery.acm.org/10.1145/1560000/1556275/p89-kroner.pdf>.*

(Continued)

*Primary Examiner*—Thuy Dao
(74) *Attorney, Agent, or Firm*—Oblon, Spivak, McClelland, Maier & Neustadt, L.L.P.

(57) ABSTRACT

A content distribution method distributes a package containing a content from a content distribution apparatus to a terminal of a content distribution destination and causes the terminal to expand and display the content contained in the distributed package by using expansion software provided in the terminal. Update data of the expansion software is inserted in the package in addition to the content. When the terminal cannot expand the content by using the expansion software provided in it, the terminal updates the expansion software provided in it by using the update data contained in the distributed package and expands the content by using the updated expansion software.

7 Claims, 7 Drawing Sheets

U.S. PATENT DOCUMENTS

| | | |
|---|---|---|
| 2002/0131428 A1 | 9/2002 | Pecus et al. |
| 2003/0051044 A1* | 3/2003 | Parry et al. .................. 709/231 |
| 2003/0182563 A1* | 9/2003 | Liu et al. .................... 713/191 |
| 2005/0021989 A1* | 1/2005 | Johnson et al. ............. 713/194 |

FOREIGN PATENT DOCUMENTS

| | | |
|---|---|---|
| JP | 2001-283160 | 10/2001 |
| KR | 2002-0026284 A | 4/2002 |
| KR | 2002-0048229 A | 6/2002 |
| WO | WO 00/77614 A2 | 12/2000 |
| WO | WO 02/37492 A1 | 5/2002 |
| WO | 2002-0062577 | 7/2002 |
| WO | 2002-0088737 | 11/2002 |

OTHER PUBLICATIONS

"On the use and performance of content distribution networks", Krishnamurthy et al., Nov. 2001, pp. 169-182, <http://delivery.acm.org/10.1145/510000/505224/p169-krishnamurthy.pdf>.*

"Digital rights management for content distribution", Liu et al., Jan. 2003, pp. 49-58, <http://delivery.acm.org/10.1145/830000/827994/p49-liu.pdf>.*

* cited by examiner

CONTENT DISTRIBUTION METHOD AND CONTENT DISTRIBUTION PACKAGE

CROSS-REFERENCE TO RELATED APPLICATIONS

This is a Continuation Application of PCT Application No. PCT/JP03/15662, filed Dec. 8, 2003, which was published under PCT Article 21(2) in Japanese.

This application is based upon and claims the benefit of priority from prior Japanese Patent Application No. 2002-365258, filed Dec. 17, 2002, the entire contents of which are incorporated herein by reference.

BACKGROUND OF THE INVENTION

1. Field of the Invention

The present invention relates to a content distribution method of distributing a content such as a document, graphic, or video and a content distribution package which contains a content as a distribution target and is distributed from a content distribution apparatus to a terminal of a content distribution destination.

2. Description of the Related Art

Along with the recent increase in transfer rate, mass storage digital contents (to be simply referred to as contents hereinafter) formed by digitizing books and newspaper can be transmitted/received in a short time through the Internet.

Hence, content distributors download mass storage contents such as books and newspaper to information terminals (client terminals) including personal computers (PCs) of intending purchaser through the Internet. In this case, a content created by various kinds of document, graphic, or video creation software is downloaded to client terminals while being inserted in a package together with metadata. The client terminal expands the downloaded content by using expansion software corresponding to the creation software which has created the content. The document, graphic, or video of the expanded content is output and displayed on a display device.

The content distributors also write mass storage contents such as books and newspaper on storage media such as CD-ROMs and memory cards and sell them to customers in stores. A user (customer) of a portable information terminal (personal digital assistants: PDA) which has no communication function or, even if it has the function, does not use it inserts a purchased storage medium such as a memory card in the portable information terminal and reads out the content stored in the storage medium into the portable information terminal. By the same process procedures as in the above-described client terminal such as a PC, the expanded content is displayed on the display device of the portable information terminal.

In such a content distribution method, sometimes, encrypted contents are distributed (sold) to customers in order to surely collect the fees of distributed (sold) contents and ensure safety (security) of contents to be distributed (sold) to terminals. In this case, the client terminal or the user (customer) of the portable information terminal must acquire a key to decrypt the encrypted contents from the content distributor for pay or free. Generally, when the content is free, the key is chargeable. When the content is chargeable, the key is free.

However, even the above-described content distribution method still has the following problems to be solved.

Document, graphic, or video creation software to create contents is frequently upgraded to improve or add functions. Every time the software is improved, the revision number (version No) is updated. Generally, a revision number which changes on the integer basis indicates that the creation software is updated. A revision number which changes in decimal places indicates that functions are added to the creation software.

When creation software to create contents is upgraded, expansion software to expand the contents in a terminal held by a customer must also be modified in accordance with the modification of creation software.

Generally, information terminals such as PCs or portable information terminals held by customers often incorporate expansion software of the latest version at that time in correspondence with the above-described creation software. Alternatively, after an information terminal is purchased, expansion software is downloaded in it for pay or free through a network.

However, the customer has no means to know when the creation software and expansion software should be revised (upgraded). He/she is informed on the display screen that the expansion software stored in his/her information terminal such as a PC or portable information terminal needs update or addition for the first time when he/she has acquired a new content and key and is going to see the document, graphic, or video of the content.

In this case, update data or additional data for the expansion software must be acquired through the network to update or add the expansion software. The work of acquiring update data or additional data for expansion software and updating or adding the expansion software is very cumbersome for the customer and also takes a long operation time. In addition, the work is very burdensome to a customer who is unaccustomed to the operation of the information terminal.

A customer who uses a portable information terminal which has no communication function or, even if it has the function, does not use it must acquire update data or additional data for expansion software by a means other than the network. In some cases, a long time is required to acquire.

As described above, even when a customer who uses an information terminal acquire a content and key for pay, he/she is sometimes unable to see the document, graphic, or video of the content immediately and unconditionally.

BRIEF SUMMARY OF THE INVENTION

It is an object of the present invention to provide a content distribution method which can largely improve a service related to content distribution of customers by automatically updating or adding expansion software in a terminal of a selling destination when the terminal receives a package containing a content so that contents are always normally expanded and displayed without placing any excess load on the customer in operation for update or addition, and a content distribution package used in the content distribution method.

The present invention is applied to a content distribution method which distributes a package containing a content from a content distribution apparatus to a terminal of a content distribution destination and causes the terminal to expand and display the content contained in the distributed package by using expansion software provided in the terminal.

In order to solve the above problems, in the content distribution method of the present invention, update data of the expansion software is inserted in the package in addition to the content. When the terminal cannot expand the content by using the expansion software provided in it, the expansion software provided in the terminal is updated by using the update data contained in the distributed package, and the content is expanded by using the updated expansion software.

In the content distribution method with the above arrangement, the update data of the expansion software is inserted in the package in addition to the content. The expansion software in the terminal is automatically updated, and the content is expanded by the updated expansion software. Since the content is expanded and displayed unconditionally, the customer who operates the terminal can surely and easily see the acquired content.

According to another invention, in the content distribution method of the above described invention, additional data of the expansion software is inserted in the package in addition to the content. When the terminal cannot expand the content by using the expansion software provided in it, the expansion software provided in the terminal is added the additional data contained in the distributed package, and the content is expanded by using the added expansion software.

Even in the content distribution method with the above arrangement, since the additional data of the expansion software is inserted in the package in addition to the content, the expansion software in the terminal is automatically added, and the content is expanded by the added expansion software, as in the above-described content distribution method of the present invention.

According to another invention, in the content distribution method of the above described invention, the terminal expands the content by using the added expansion software, and then deletes the additional data to recover in the terminal to the expansion software originally provided.

In the content distribution method with the above arrangement, after the content is expanded, the expansion software returns to the original expansion software. The content distributor can cause the customer's terminal to display the content in a unique format by, e.g., creating the content by unique creation software and inserting additional data unique to the expansion software in the package.

In addition, when additional data which is less frequently used is deleted after use, the processing load on the expansion software in the terminal can be reduced later.

According to another invention, in the content distribution method of the above described invention, the content contained in the package distributed from the content distribution apparatus to the terminal is encrypted. And, the terminal acquires a key to decrypt the encrypted content contained in the package from a key management apparatus for pay.

In the content distribution method with the above arrangement, in addition to the above-described advantage of properly expanding the distributed content, safety (security) of the content contained in the package distributed, e.g., for free can be increased. In addition, the reliability of fee collection for the content can be increased.

According to another invention, in the content distribution method of the above described invention, the terminal comprises a portable information terminal. And, the package and key are received by the portable information terminal while being recorded on separate recording media.

According to another invention, in the content distribution method of the above described invention, the terminal comprises a client terminal having a communication function. And, the package and key are received by the client terminal through a network.

According to another invention, a content distribution package which contains a content and is distributed from a content distribution apparatus to a terminal of a content distribution destination, characterized in that update data for expansion software to expand and display the content in the terminal is inserted in addition to the content.

According to another invention, in the content distribution package, additional data for expansion software to expand and display the content in the terminal is inserted in addition to the content.

DETAILED DESCRIPTION OF THE INVENTION

An embodiment of the present invention will be described below with reference to the accompanying drawings.

Figure 1:
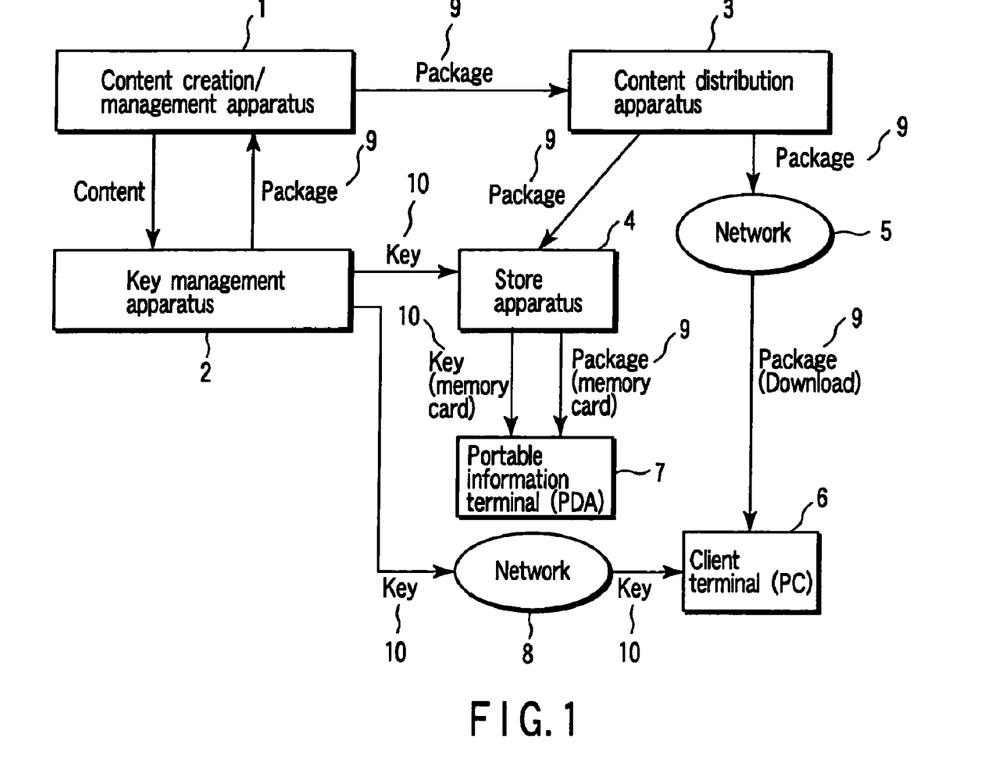
FIG. 1 is a schematic view showing the schematic arrangement of a content sales system to which a content distribution method using a content distribution package according to an embodiment of the present invention is applied.

FIG. 1 is a schematic view showing the schematic arrangement of a content sales system to which a content distribution method using a content distribution package according to an embodiment of the present invention is applied.

In this content sales system, a content creation/management apparatus 1 creates a content to be sold to a customer and manages a package 9 containing the content. A key management apparatus 2 encrypts the content, inserts it in the package 9, and provides a key 10 to decrypt the encrypted content to a store apparatus 4 and client terminal 6 for pay. A content distribution apparatus 3 distributes the package 9 delivered from the content creation/management apparatus 1 to the client terminal 6 through a network 5 and also to the store apparatus 4.

The store apparatus 4 is installed in, e.g., a bookstore or software store. The store apparatus 4 distributes, to a customer, a recording medium such as a memory card on which the package 9 distributed from the content distribution apparatus 3 is recorded. The store apparatus 4 also writes the key 10 received from the key management apparatus 2 on a recording medium such as a memory card and sells it to the customer.

A portable information terminal 7 such as a PDA owned by the customer receives the package 9 and key 10, which are stored in separate memory cards, decrypts the content contained in the package 9 by using the key 10, and displays the content on the display device.

The client terminal 6 such as a PC owned by the customer receives the package 9 for free from the content distribution apparatus 3 through the network 5. The client terminal 6 also receives the key 10 for pay from the key management apparatus 2 through a network 8. The client terminal 6 decrypts the content contained in the package 9 by using the key 10 and displays the content on the display device.

Figure 2:
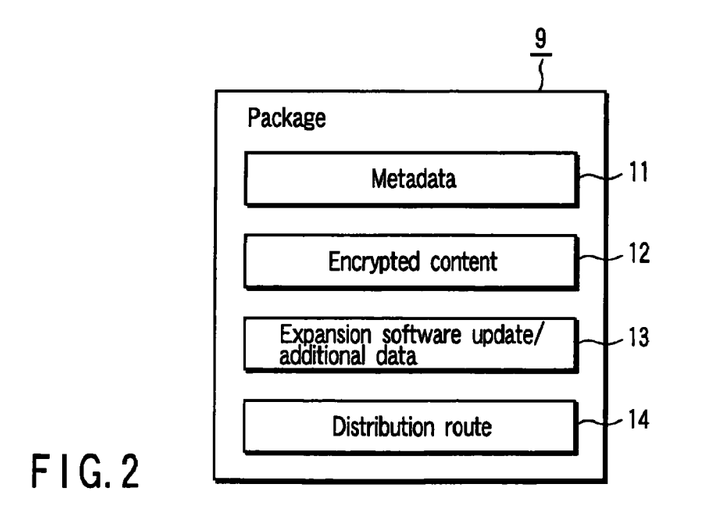
FIG. 2 is a view showing the structure of a package distributed in the content sales system according to the embodiment.

The package 9 including software modules contains metadata 11 representing the attribute of the content, including the title, data length, data type, and selling price of the content, an encrypted content 12, expansion software update/additional data 13, and a distribution route 14. The distribution route 14 is written when the package 9 is distributed from the content distribution apparatus 3 to the client terminal 6 or store apparatus 4.

Figure 3:
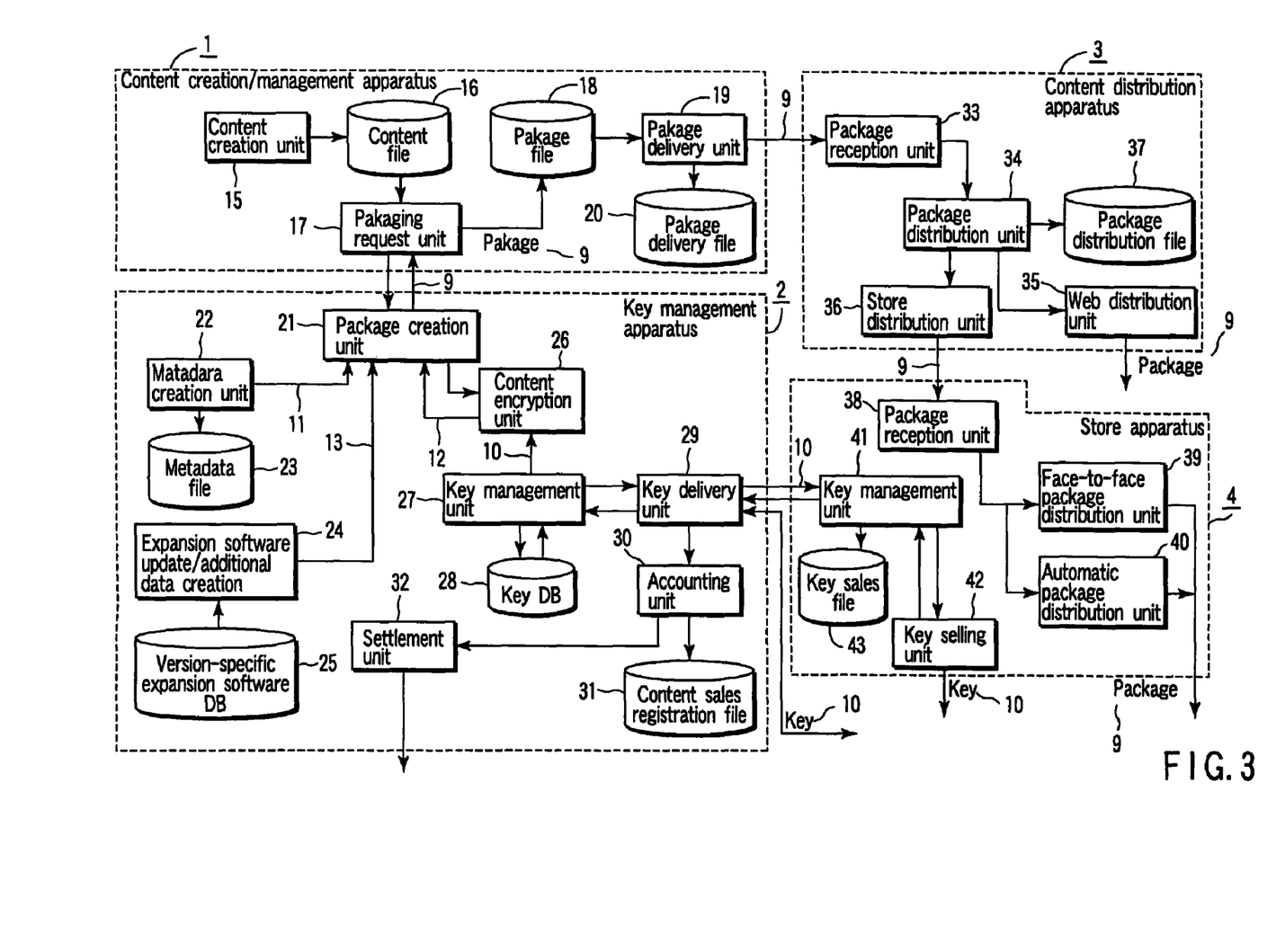
FIG. 3 is a block diagram showing the detailed arrangement of the content sales system according to the embodiment.

FIG. 3 is a block diagram showing the detailed arrangements of the content creation/management apparatus 1, key management apparatus 2, content distribution apparatus 3, and store apparatus 4 in the content sales system.

In the content creation/management apparatus 1, a content creation unit 15 creates a content such as a document, graphic, or video by using corresponding creation software and stores the content in a content file 16. The creation software is, for example, "WORD", "PDF", "PowerPoint", or "MPEG". A packaging request unit 17 sends the content in the content file 16 to the key management apparatus 2. The packaging request unit 17 also stores the package 9 received from the key management apparatus 2 in a package file 18. A package delivery unit 19 delivers each package 9 in the package file 18 to the content distribution apparatus 3. The package delivery unit 19 also registers the delivery record of each package 9 in a package delivery file 20.

In the key management apparatus 2, a package creation unit 21 creates the package 9 shown in FIG. 2 on the basis of the content input from the content creation/management apparatus 1 and returns the package 9 to the content creation/management apparatus 1.

A metadata creation unit 22 creates the metadata 11 representing the attribute of the content, including the title, data length, data type, and selling price of the content, and sends the metadata 11 to the package creation unit 21. The metadata creation unit 22 also stores the created metadata 11 in a metadata file 23.

A version-specific expansion software database (DB) 25 stores expansion software of each version corresponding to creation software of each version, which is used by the content creation unit 15. The expansion software is, for example, "WORD", or "PDF reader" as a document reader, and "PowerPoint viewer", or "MPEG" as a image expander (image reader). An expansion software update/additional data creation unit 24 creates the expansion software update/additional data 13 from the basic (version No. 1) expansion software to expand the content input from the content creation/management apparatus 1 and sends the expansion software update/additional data 13 to the package creation unit 21.

When expansion software before the version No. of the expansion software update/additional data 13 is present in the client terminal 6 or portable information terminal 7, the expansion software is updated or added by using the expansion software update/additional data 13. Hence, the content of the input package 9 can be expanded in the client terminal 6 or portable information terminal 7.

The expansion software update/additional data 13 is added with temporary status which indicates that the expansion software update/additional data 13 is effective for only the content. This temporary status is selectively added only when the expansion software update/additional data 13 is additional data. When the expansion software update/additional data 13 is update data, no temporary status is added. As described above, the temporary status is applied when the content is created by unique creation software, and unique additional data for expansion software is contained in the package 9.

A key management unit 27 creates the key 10 including an array of a plurality of numbers and sends the key 10 to a content encryption unit 26. The key management unit 27 also registers the key 10 in a key database (DB) 28. The key management unit 27 also reads out the key 10 from the key database (DB) 28 in accordance with a request for the key 10 for a designated content from a key delivery unit 29 and returns the key 10 to the key delivery unit 29. The content encryption unit 26 encrypts the input content in accordance with conditions which allow decryption by the input key 10 and sends the encrypted content 12 to the package creation unit 21.

In accordance with a transmission request of the key 10 for a designated content from the client terminal 6 or store apparatus 4, the key delivery unit 29 requests the key 10 corresponding to the content of the key management unit 27. The key delivery unit 29 transmits, to the client terminal 6 or store apparatus 4 as the request source, the key 10 received from the key management unit 27 for pay. In addition, the key delivery unit 29 transmits the delivery record of the key 10 to an accounting unit 30 and settlement unit 32. The accounting unit 30 updates the content sales amount in a content sales registration file 31 on the basis of the delivery record. The settlement unit 32 executes settlement of the bill of the content for the customer and store apparatus 4.

In the content distribution apparatus 3, a package distribution unit 34 adds the distribution route 14 of the content distribution apparatus 3 of its own and a Web delivery unit 35 to the package 9 which is delivered from the content creation/management apparatus 1 to a package reception unit 33. Then, the package distribution unit 34 distributes the package 9 to the client terminal 6, which has requested the distribution, through the Web distribution unit 35. The package distribution unit 34 also adds, to the delivered package 9, the distribution route 14 of the content distribution apparatus 3 of its own and the store apparatus 4 of the distribution destination and then distributes the package 9 to a store distribution unit 36. In addition, the package distribution unit 34 registers the distribution record of the package 9 in a package distribution file 37.

The store distribution unit 36 writes the input package 9 on a compact memory card such as a secure digital (SD) memory card and distributes the package 9 to the store apparatus 4 installed in a bookstore or software store. The store distribution unit 36 can also distribute (deliver) the input package 9 without recording it on a recording medium.

In the store apparatus 4, the package 9 from the content distribution apparatus 3 is received by a package reception unit 38. A face-to-face package distribution unit 39 causes a clerk (salesclerk) to distribute for free the memory card on which the received package 9 is recorded to a customer who wants it. An automatic package distribution unit 40 automatically distributes for free the memory card, on which the package 9 transmitted from the content distribution apparatus 3 to the package reception unit 38 is recorded, to a customer who wants it.

Upon receiving a key purchase request with a content designation from the customer, a key selling unit 42 transmits the key purchase request to a key management unit 41. The key management unit 41 transmits a key transmission request with the content designation to the key management apparatus 2. When the corresponding key 10 is received from the key management apparatus 2, the key management unit 41 writes the key 10 on a memory card different from that of the package 9 and distributes (transports) the memory card to the key selling unit 42. The key selling unit 42 delivers the memory card on which the key 10 is written to the customer in exchange for money. The key management unit 41 registers the sales of the key 10 in a key sales file 43.

Figure 4:
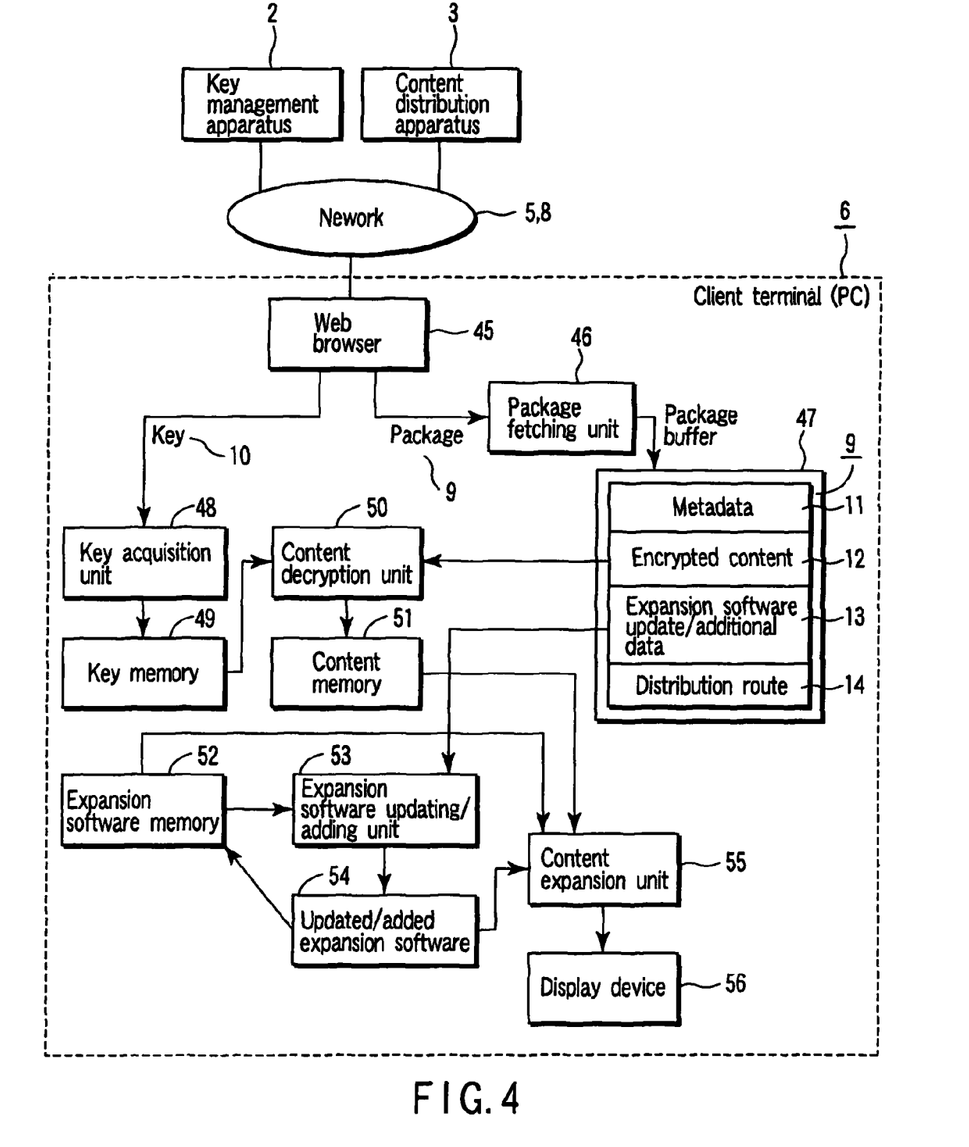
FIG. 4 is a block diagram showing the arrangement of a client terminal of the content sales system according to the embodiment.

The client terminal 6 such as a PC owned by the customer has, e.g., the arrangement shown in FIG. 4.

The client terminal 6 incorporates a Web browser 45, package fetching unit 46, and key acquisition unit 48. The Web browser 45 exchanges information with the content distribution apparatus 3 and key management apparatus 2 through the network 5 and 8. The package fetching unit 46 fetches the package 9 through the Web browser 45 and temporarily stores the fetched package 9 in a package buffer 47. The key acquisition unit 48 fetches the key 10 corresponding to the package 9 through the Web browser 45 for pay and writes the fetched key 10 in a key memory 49.

The client terminal 6 also incorporates a content decryption unit 50, expansion software memory 52, and expansion software updating/adding unit 53. The content decryption unit 50 decrypts the encrypted content 12 in the package 9 by using the key 10 and writes the content in a content memory 51. The expansion software memory 52 stores expansion software of the client terminal, which corresponds to each creation software. The expansion software updating/adding unit 53 updates/adds the expansion software of the client terminal, which is stored in the expansion software memory 52, on the basis of the expansion software update/additional data 13 in the package 9 and writes the updated/added expansion software in an updated/added expansion software memory 54.

The client terminal 6 also incorporates a content expansion unit 55 which expands the decrypted content in the content memory 51 by using the updated/added expansion software and displays the content on a display device 56.

Figure 5:
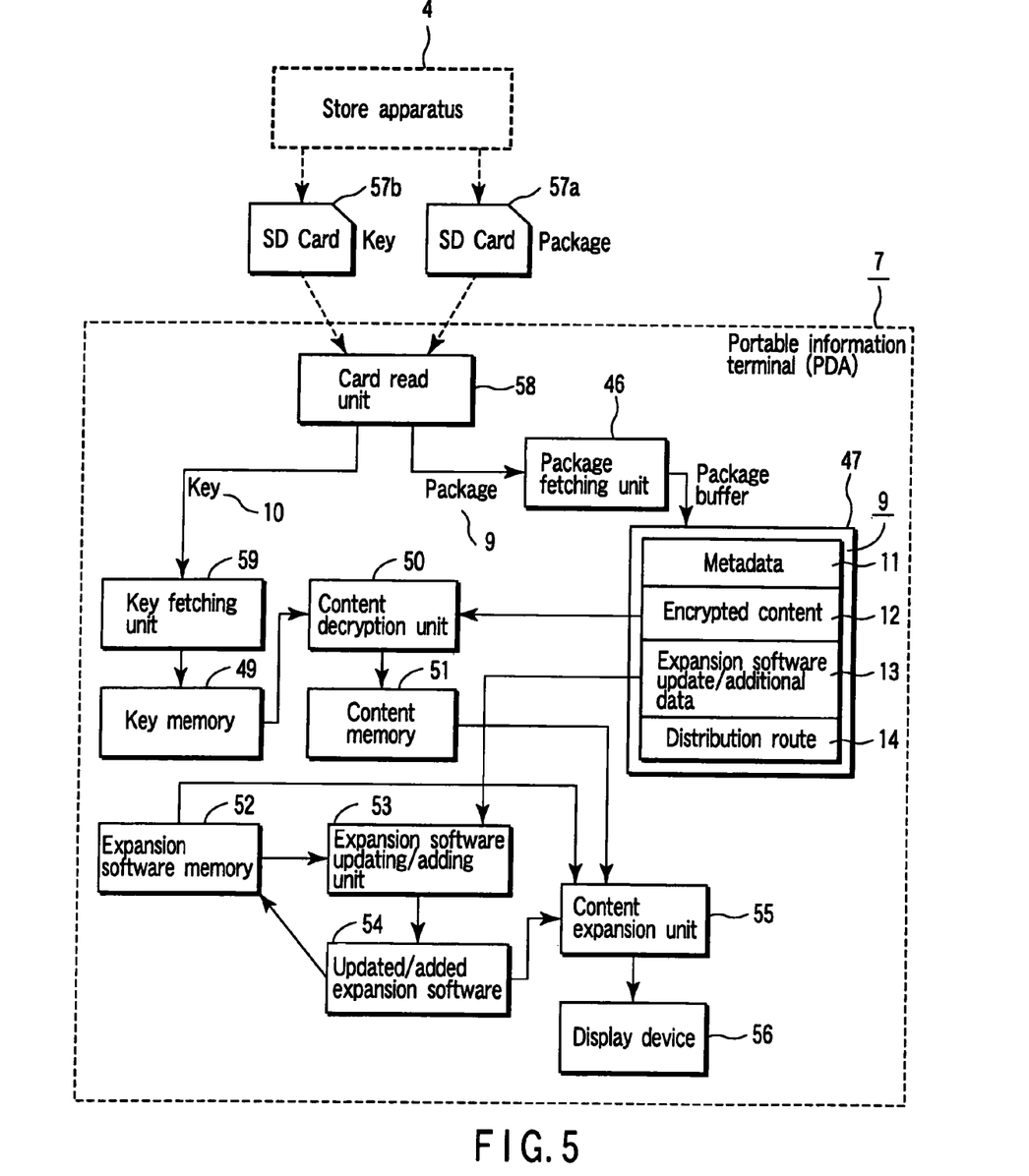
FIG. 5 is a block diagram showing the arrangement of a portable information terminal of the content sales system according to the embodiment.

The portable terminal 7 such as a PDA owned by the customer has, e.g., the arrangement shown in FIG. 5.

The portable information terminal 7 incorporates a card read unit 58, the package fetching unit 46, and a key fetching unit 59. A memory card 57a on which the package 9 distributed for free in the store apparatus 4 is recorded or a memory card 57b on which the key 10 purchased in the store apparatus 4 is recorded is inserted in the card read unit 58. The package fetching unit 46 temporarily stores, in the package buffer 47, the package 9 read out from the memory card 57a by the card read unit 58. The key fetching unit 59 writes, in the key memory 49, the key 10 read out from the memory card 57b by the card read unit 58.

The portable information terminal 7 also incorporates the content decryption unit 50, content memory 51, expansion software memory 52, expansion software updating/adding unit 53, updated/added expansion software memory 54, content expansion unit 55, and display device 56, like the client terminal 6 shown in FIG. 4.

Figure 6:
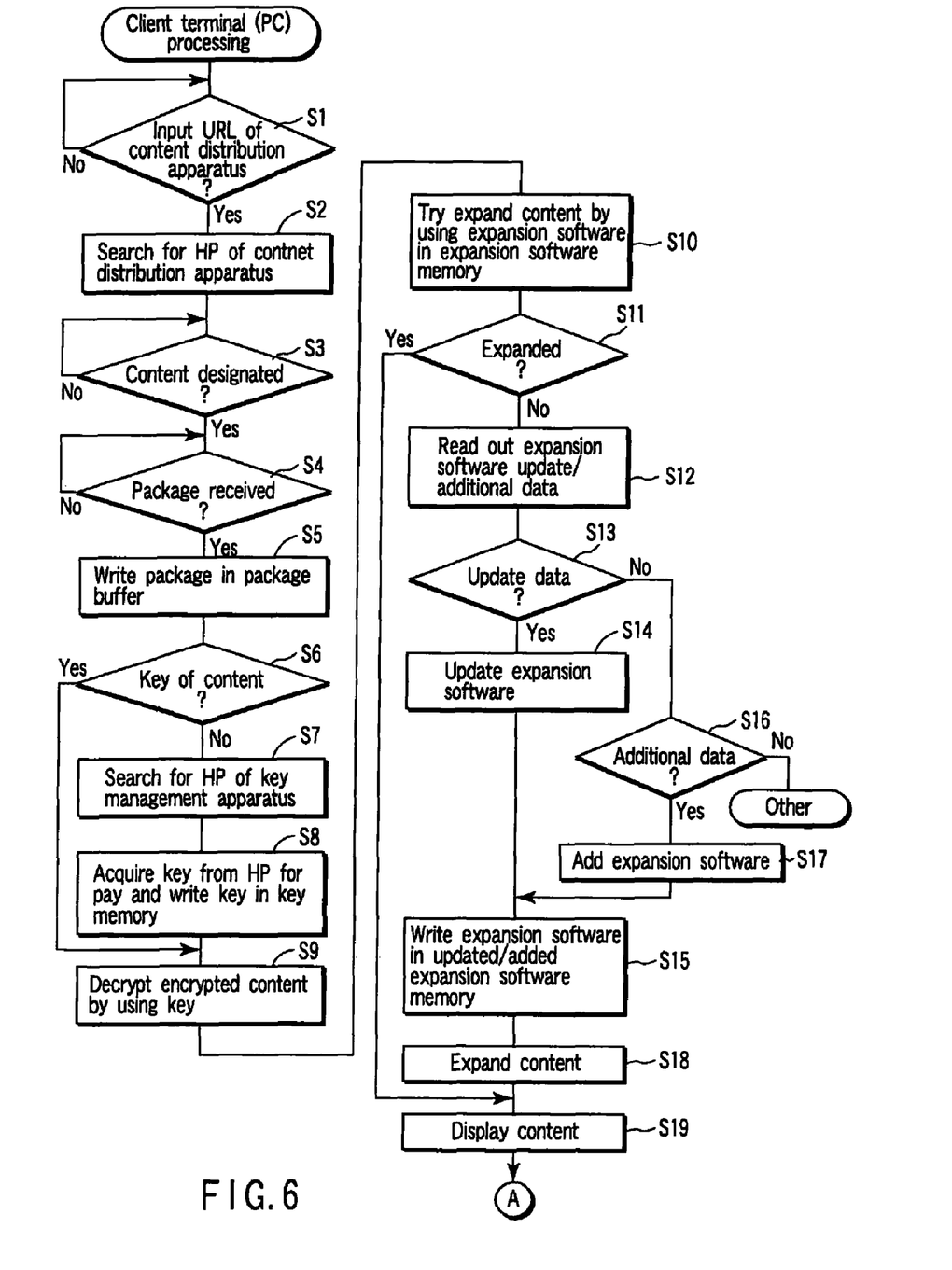
FIG. 6 is a flowchart showing the operation of the client terminal of the content sales system according to the embodiment.
Figure 7:
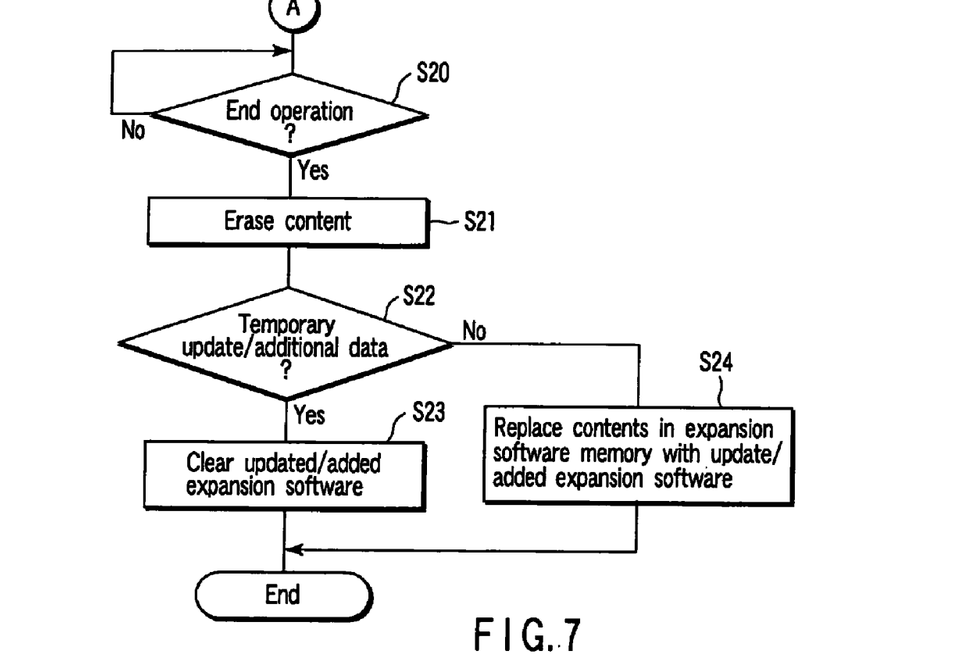
FIG. 7 is a flowchart showing the operation of the client terminal of the content sales system according to the embodiment.

The units 45 to 56 of the client terminal 6 such as a PC owned by the customer execute expansion/display processing for a content in accordance with the flowcharts shown in FIGS. 6 and 7.

When the URL of the content distribution apparatus 3 is input by the operation of the customer (S1), the homepage (HP) of the content distribution apparatus 3 is searched for (S2). The homepage is displayed on the display device 56 of the client terminal. When a desired content is designed on the homepage by the operation of the customer (S3), the package 9 is transmitted from the content distribution apparatus 3. The package 9 is received (S4) and written in the package buffer 47 (S5).

When the key 10 of the content corresponding to the content name of the metadata 11 in the package 9 is not present in the key memory 49 (S6), the homepage of the key management apparatus 2 is searched for (S7). The key 10 of the content is acquired for pay on the homepage and written in the key memory 49 (S8). The encrypted content 12 contained in the package 9 is decrypted by using the key 10 stored in the key memory 49 and written in the content memory 51 (S9). When the key 10 of the content is present in the key memory 49 (S6), the content 12 is decrypted by using the key 10 (S9).

The terminal tries to expand the decrypted content stored in the content memory 51 by using expansion software stored in the expansion software memory 52 (S10). When the content is normally expanded (S11), the expanded content is output and displayed on the display device 56 (S19).

When the content is not normally expanded (S11), the expansion software update/additional data 13 contained in the package 9 is read out (S12). When the expansion software update/additional data 13 is update data (S13), the expansion software read out from the expansion software memory 52 is updated by using the update data (S14). The updated expansion software is written in the updated/added expansion software memory 54 (S15).

When the expansion software update/additional data 13 contained in the package 9 is additional data (S16), the additional data is added to the expansion software read out from the expansion software memory 52 (S17). The added expansion software is written in the updated/added expansion software memory 54 (S15).

The decrypted content stored in the content memory 51 is expanded by using updated/added expansion software stored in the updated/added expansion software memory 54 (S18). The expanded content is output and displayed on the display device 56 (S19).

When the operator (customer) executes the end operation of content display (S20), the displayed content is erased (S21). If the temporary status is added to the expansion software update/additional data 13 (S22), the expansion software update/additional data 13 is regarded as temporary data effective for only the content. The updated/added expansion software stored in the updated/added expansion software memory 54 is cleared (S23).

If no temporary status is added to the expansion software update/additional data 13 (S22), the contents stored in the expansion software memory 52 are replaced with the updated/added expansion software stored in the updated/added expansion software memory 54 (S24).

Figure 8:
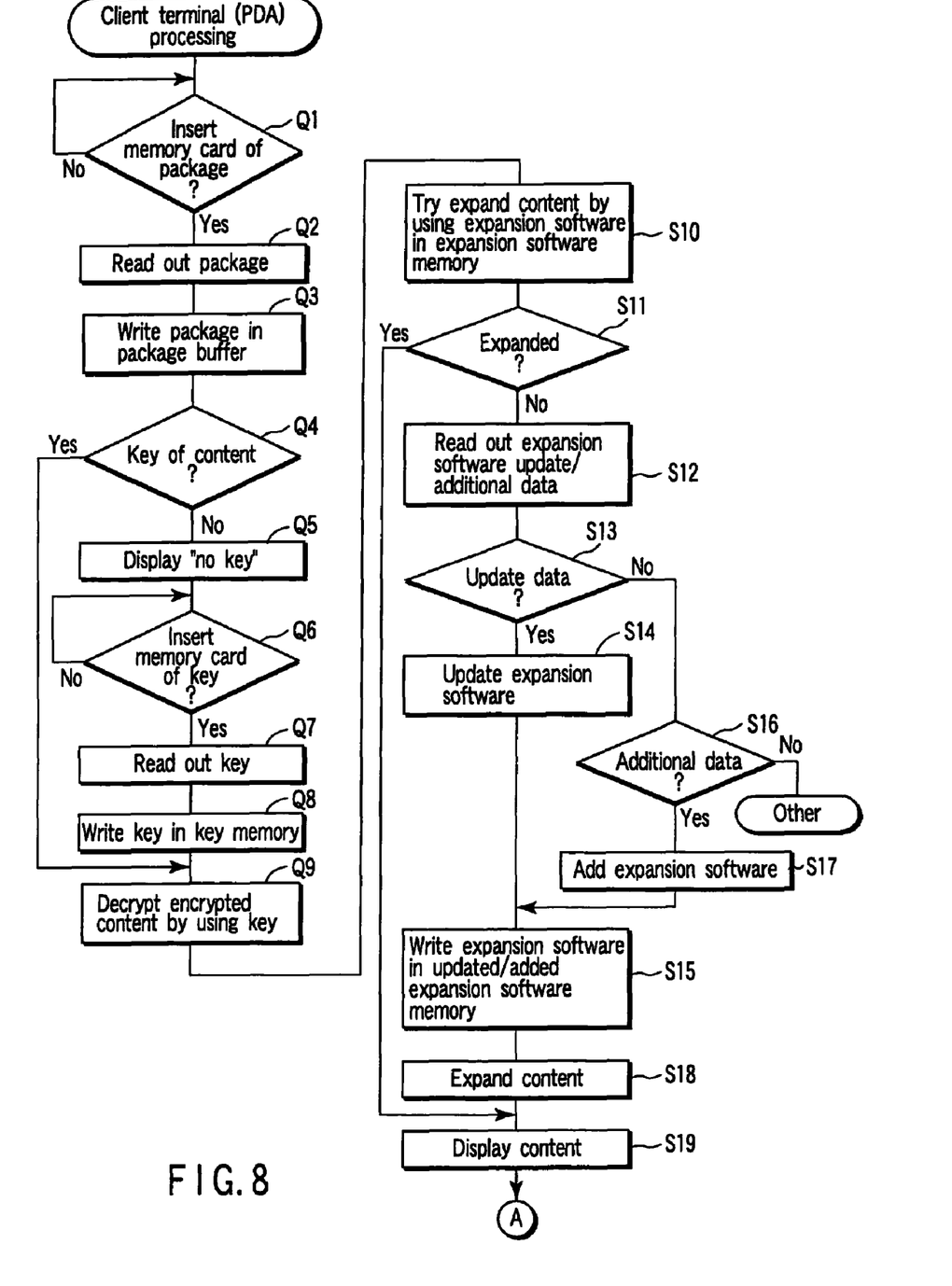
FIG. 8 is a flowchart showing the operation of the portable information terminal of the content sales system according to the embodiment.
Figure 9:
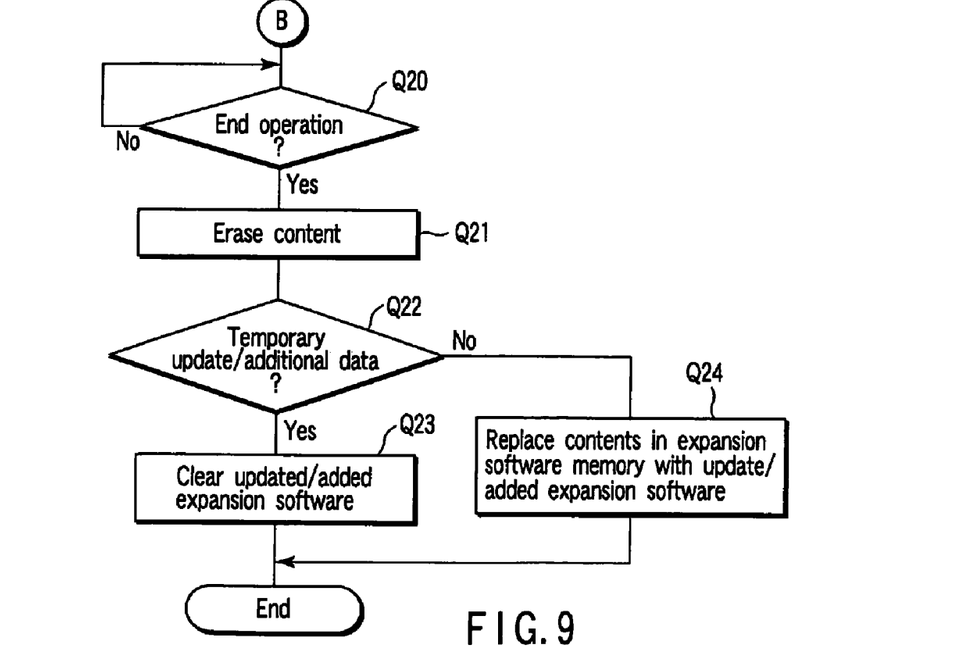
FIG. 9 is a flowchart showing the operation of the portable information terminal of the content sales system according to the embodiment.

The units 46 to 56, 58, and 59 of the portable information terminal 7 such as a PDA owned by the customer execute expansion/display processing for a content in accordance with the flowcharts shown in FIGS. 8 and 9.

When the memory card 57a which stores the package 9 is inserted in the card read unit 58 by the operation of the customer (Q1), the package 9 stored in the memory card 57a is read out (Q2) and written in the package buffer 47 (Q3). When the key 10 of the content corresponding to the content name of the metadata 11 in the package 9 is not present in the key memory 49 (Q4), "no key" is displayed on the display device 56 (Q5).

When the memory card 57b which stores the key 10 is inserted in the card read unit 58 by the operation of the customer (Q6), the key 10 stored in the memory card 57b is read out (Q7) and written in the key memory 49 (Q8). The encrypted content 12 contained in the package 9 is decrypted by using the key 10 stored in the key memory 49 and written in the content memory 51 (Q9). When the key 10 of the content is present in the key memory 49 (Q4), the content 12 is decrypted by using the key 10 (Q9).

Processing in steps Q10 to Q24 is the same as that in steps S10 to S24 in the client terminal 6 shown in FIGS. 6 and 7, and a description thereof will be omitted.

In the content sales system to which the content distribution method with the above arrangement is applied, the package 9 distributed from the content distribution apparatus 3 to the client terminal 6 such as a PC through the network 5 or the package 9 which is distributed from the content distribution apparatus 3 to the portable information terminal 7 through the store apparatus 4 while being stored in the memory card 57a contains update data or additional data of expansion software as well as the encrypted content 12.

Only when the expansion software stored in the expansion software memory 52 of the client terminal 6 or portable information terminal 7 cannot expand the distributed content, the expansion software is automatically updated by the update data, or the additional data is automatically added. The content is expanded by the updated or added expansion software.

The content is expanded and displayed on the display device 56 immediately and unconditionally. The customer who operates the client terminal 6 or portable information terminal 7 can surely and easily see the content contained in the acquired package 9 without concern for the version No. (revision number) of the expansion software stored in the expansion software memory 52 of the terminal.

Since update data or additional data to update or add the expansion software stored in the expansion software memory 52 of the terminal need not separately be acquired, the operation load for the customer can largely be reduced.

A customer who uses the portable information terminal 7 which has no communication function or, even if it has the function, does not use it cannot easily acquire update data or additional data. Hence, inserting the update data or additional data of expansion software in the package 9 in addition to the content 12 is very convenient.

When the update/additional data 13 is additional data, a temporary status is added, as needed, which indicates that the additional data is temporary data effective for only the content. After the content is expanded and displayed by the expansion software added with the additional data, the added additional data is deleted from the expansion software to return the expansion software of the terminal to the original expansion software.

The content is created by unique creation software, and unique additional data for expansion software is added with the temporary status and contained in the package 9. Hence, the copyright of the content including the display format can be protected.

In addition, when special additional data related to expansion of, e.g., a moving image which is less frequently used is deleted after use, the processing load on the expansion software in the client terminal 6 or portable information terminal 7 can be reduced later.

The content 12 contained in the package 9 distributed from the content distribution apparatus 3 to the client terminal 6 or portable information terminal 7 for free is encrypted. The client terminal 6 or portable information terminal 7 acquires the key 10 to decrypt the encrypted content 12 contained in the package 9 from the key management apparatus 2 for pay through the network 8 and store apparatus 4.

Hence, safety (security) of the content contained in the package 9 and distributed for free can be increased. In addition, the fee of the content can surely be collected.

The present invention is not limited to the system of the above-described embodiment. In this embodiment, the content distribution method of the present invention is applied to a content sales system which sells contents to customers. However, the content distribution method of the present invention can also be applied to a content rental system which rents contents to customers for pay.

What is claimed is:

1. A content distribution method, executed by a computer, which distributes a package containing a content from a content distribution apparatus to a terminal and causes the terminal to read and display the content contained in the distributed package by using a reading software provided in the terminal, comprising:

inserting update data for the reading software or additional data for the reading software in the package in addition to the content;

inserting, into the package, metadata representing attributes of the content, the attributes of the content including content title, content size, and content type;

inserting, into the package, a distribution route of the package;

encrypting the content; and distributing, using the inserted distribution route, the package from the content distribution apparatus to the terminal, when the terminal cannot read and display the encrypted content by using the reading software provided in the terminal, causing the terminal to update the reading software provided in the terminal by using the update data inserted in the distributed package and to read and display the encrypted content by using the updated reading software; or causing the terminal to add the additional data inserted in the distributed package to the reading software provided in the terminal to generate added reading software and to read and display the encrypted content by using the generated added reading software.

2. A content distribution method according to claim 1, further comprising:

deleting the additional data after the terminal reads and displays the encrypted content by using the added reading software to return the reading software provided in the terminal to the reading software originally provided.

3. A content distribution method according to claim 2, wherein the terminal acquires a key to decrypt the encrypted content contained in the distributed package from a key management apparatus in exchange for payment.

4. A content distribution method according to claim 3, wherein the terminal comprises a portable information terminal, and the distributed package and key are received by the portable information terminal while being recorded on separate recording media.

5. A content distribution method according to claim 1, wherein the terminal acquires a key to decrypt the encrypted content contained in the distributed package from a key management apparatus in exchange for payment.

6. A content distribution method according to claim 5, wherein the terminal comprises a portable information terminal, and the distributed package and key are received by the portable information terminal while being recorded on separate recording media.

7. A content distribution method according to claim 5, wherein the terminal comprises a client terminal having a communication function, and the distributed package and key are received by the client terminal through a network.

* * * * *